United States Patent [19]

Douaud et al.

[11] 4,120,272

[45] Oct. 17, 1978

[54] DEVICE FOR OPTIMUM CONTROL OF THE SPARKING TIME OF A SPARK IGNITION ENGINE, DURING ITS OPERATION

[75] Inventors: André Douaud, Puteaux; Joseph Rialan, Meudon, both of France

[73] Assignee: Institut Francais du Petrole, France

[21] Appl. No.: 752,852

[22] Filed: Dec. 21, 1976

[30] Foreign Application Priority Data

Dec. 30, 1975 [FR] France .................................. 75 40081

[51] Int. Cl.² ........................... F02P 5/14; F02P 3/08
[52] U.S. Cl. ............................ 123/117 D; 123/117 R; 123/148 E
[58] Field of Search ........ 123/32 EA, 32 EB, 32 EC, 123/32 EK, 117 D, 119 ED, 148 E; 364/431

[56] References Cited

U.S. PATENT DOCUMENTS

| 2,220,558 | 5/1939 | Van Dijck et al. | 123/119 ED |
|---|---|---|---|
| 3,789,816 | 2/1974 | Taplin et al. | 123/32 EA |
| 3,875,912 | 4/1975 | Bullo | 123/148 E |
| 4,044,234 | 8/1977 | Frobenius et al. | 123/32 EA |

*Primary Examiner*—Charles J. Myhre
*Assistant Examiner*—P. S. Lall
*Attorney, Agent, or Firm*—Craig & Antonelli

[57] ABSTRACT

This device comprises, in combination, means generating a digital value equal to the difference between a number of cycles of the engine and the number of knockings detected during the period of said cycles and means controlling the spark advance point in response to said difference.

19 Claims, 6 Drawing Figures

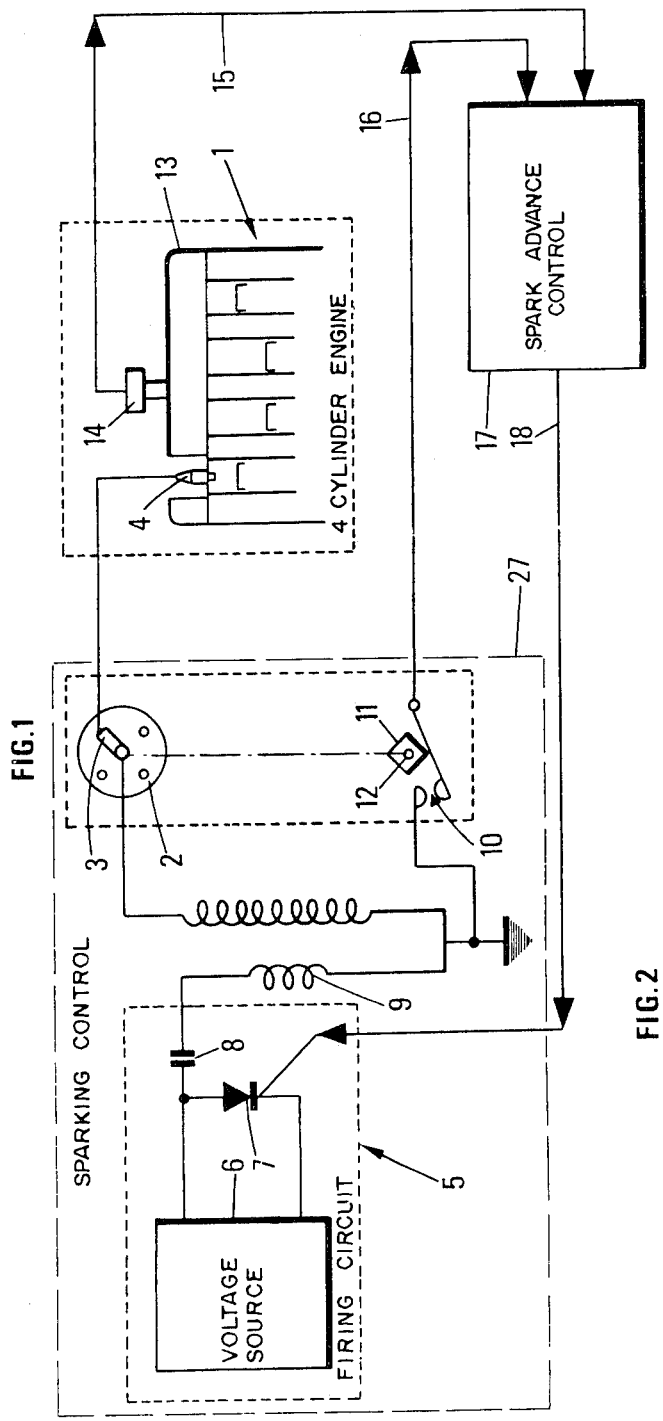

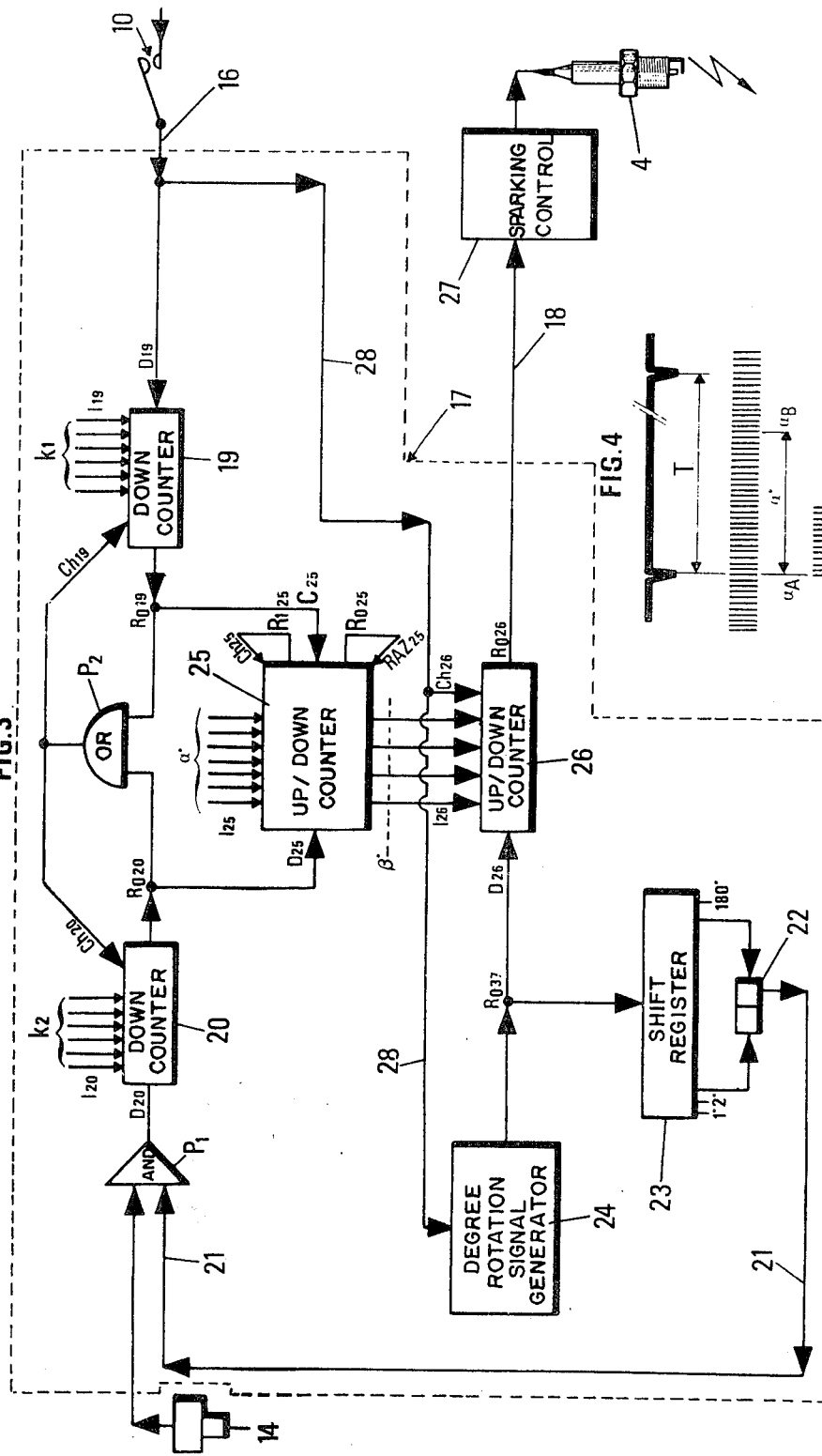

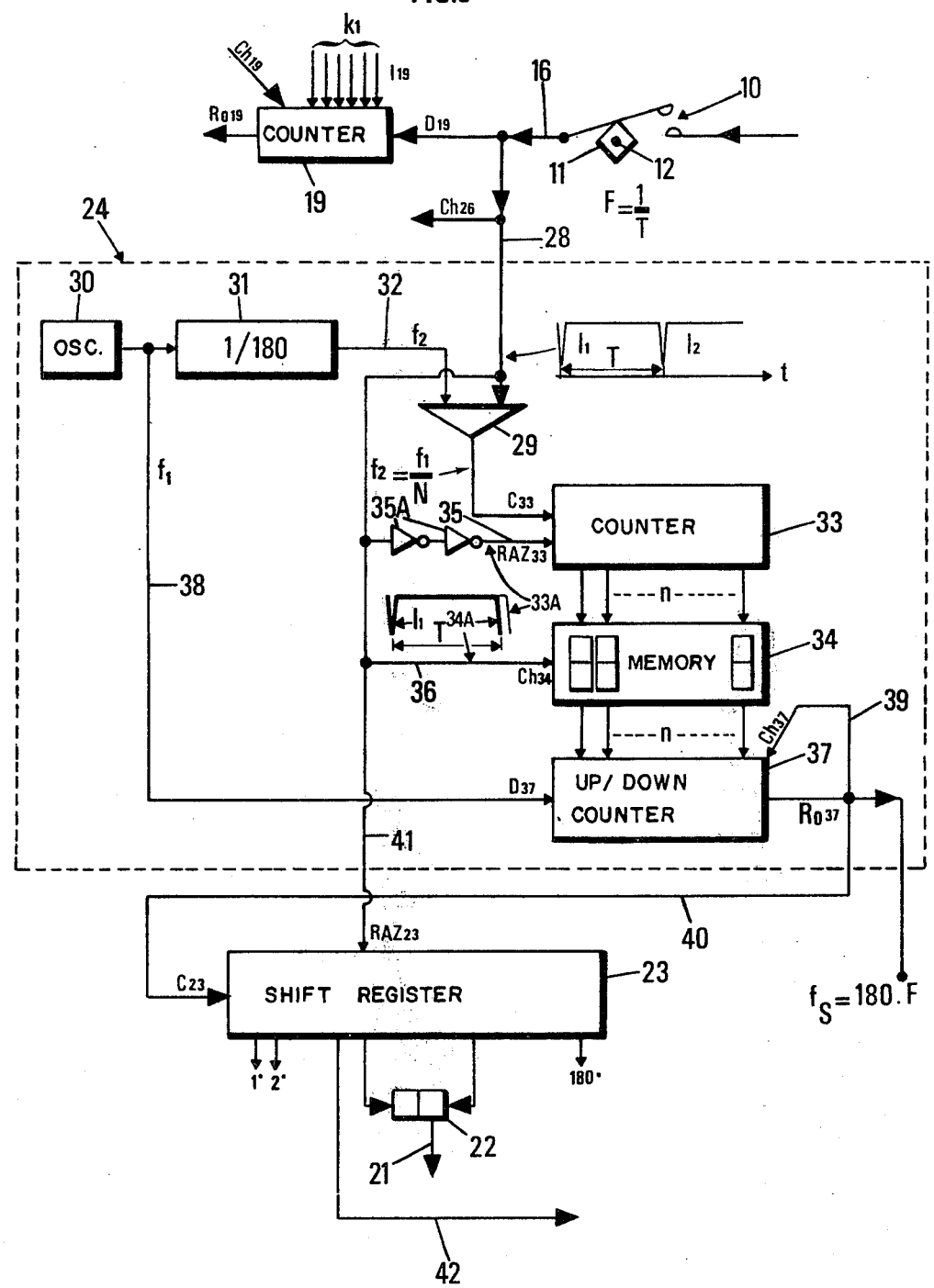

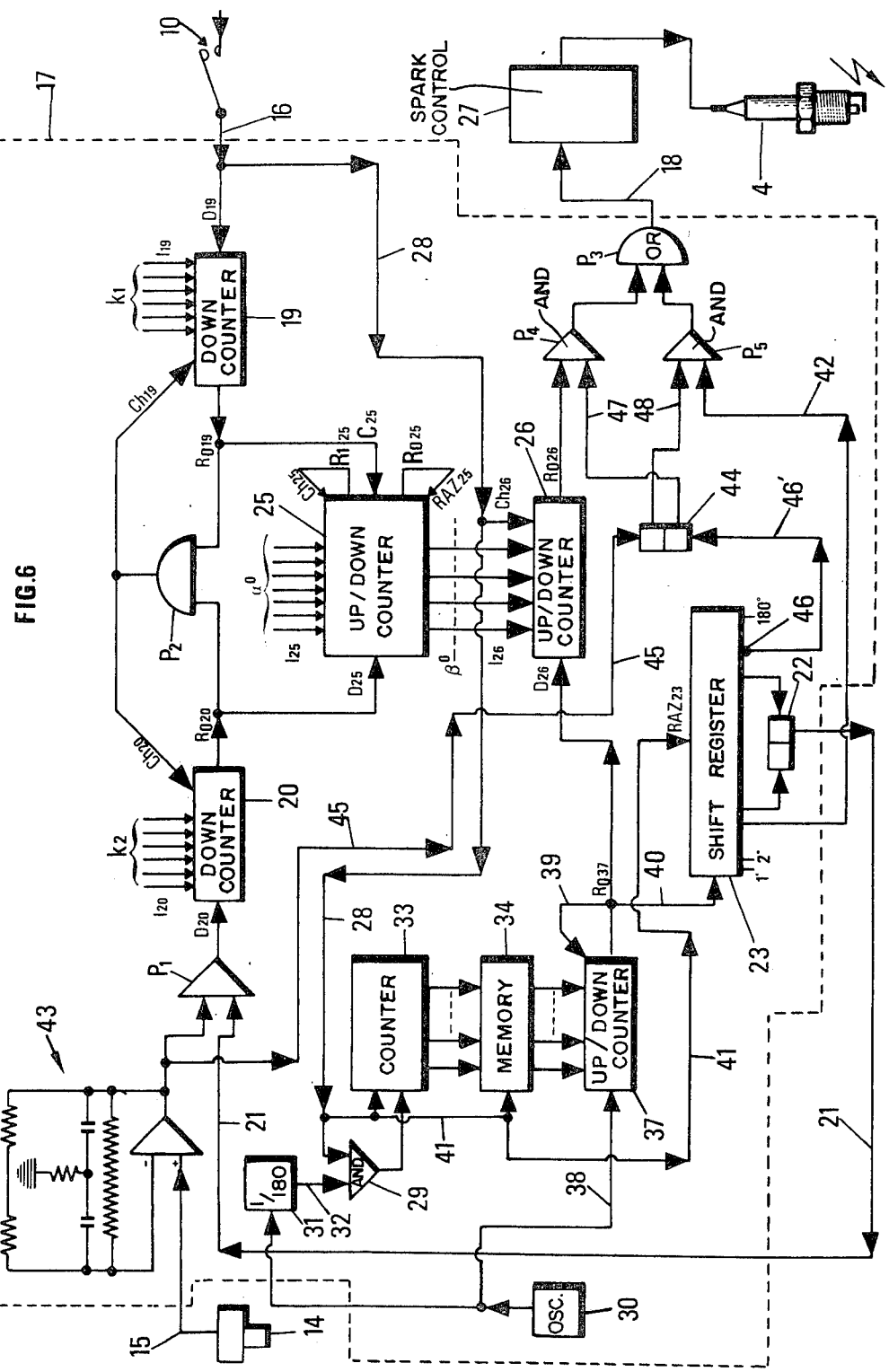

DEVICE FOR OPTIMUM CONTROL OF THE SPARKING TIME OF A SPARK IGNITION ENGINE, DURING ITS OPERATION

The present invention relates to a device for optimum control of the sparking or firing time of a spark ignition engine during its operation, in dependence with the resistance to knocking or pinking of the air-fuel mixture feeding the engine.

As is well known, knocking or detonation is an abnormal type of combustion in spark ignition engines. This phenomenon involves pressure oscillations of the gases in the combustion chamber, as a result of the self-ignition of the air-fuel mixture before this mixture can be burnt according to the normal combustion process, by propagation of a flame front.

Certain operating conditions of the engine, leading to high pressure and temperature levels of the gases during the combustion period, are particularly favourable to the occurrence of the knocking phenomenon.

The proposed prior solutions for reducing the knocking liability comprise, on the one hand, the preparation of fuels of sufficient anti-knocking properties for most of the cars, and, on the other hand, a proper selection of some design parameters of the engine (such as the compression ratio) and of control parameters (spark advance point, operating temperatures), so that the engines can be properly operated with the fuels available on the market.

The solutions relating to the fuel are costly and those relating to the engine are detrimental to its power yield.

All of the above-indicated solutions are generally worked out with a high safety factor, so that knocking is very unlikely to occur.

Actually, to-day's engines are not provided with means for suppressing knocking when the latter appears and therefore this phenomenon becomes more and more enhanced, which might result in the destruction of the engine.

The invention provides an automatic device which detects knocking, when it occurs in an engine, and which delays the ignition point during the operation of the engine until the detected knocking disappears. When knocking has disappeared, as a result either of this delaying of the ignition point, or of a change in the working conditions of the engine, the device according to the invention progressively shifts forward the ignition point until it reaches a preselected reference value.

The accompanying drawings show a non limitative embodiment of the invention.

FIG. 1 diagrammatically shows an engine equipped with a device according to the invention, FIG. 2 diagrammatically illustrates a device for up-counting and downcounting electric pulses, FIG. 3 is a simplified diagram of a device according to the invention, FIG. 4 represents, versus time, the signals generated by this device, FIG. 5 illustrates electronic means for detecting degree by degree the rotation of the crankshaft, FIG. 6 is an overall view of a device according to the invention.

FIG. 1 shows, by way of example, a four cylinder engine 1 equipped with a device according to the invention.

2 designates the distributor.

Let it be assumed that the slider 3 of the distributor is in the position of sparking of the plug 4.

Reference numeral 27 designates as a whole the sparking control means connected to the spark plug 4.

The electronic firing circuit 5, operated by a capacitor discharge, comprises, in conventional manner, a source of electric voltage 6 connected to a capacitor discharge circuit comprising a thyristor 7 connected in parallel and a capacitor 8 connected in series to the primary winding 9 of the ignition coil.

The breaker 10 is controlled by the cam 11 rotated by the shaft 12 of the distributor.

The cylinder head 13 of the engine is provided with a vibration sensor 14, such as an accelerometer, delivering electric signals when the cylinder head is subjected to vibrations. For this purpose there can be used an accelerometer responsive to vibrations in the frequency range of the knocking phenomenon. These knocking frequencies vary with the type of engine and will be for example in the range from 6,000 to 8,000 Hertz.

Since the vibrations of the cylinder head are not only caused by the knocking phenomenon, if any, but also result from striking of distribution parts (valves, cams . . . etc. . . ), it is necessary to select between the electric signals delivered by the detector 14 only those resulting from the knocking phenomenon.

Taking into account the fact that the vibrations of the cylinder head resulting from the knocking phenomenon only occur during a limited known interval of the power cycle, starting slightly after the top dead center of the combustion stage, angular detection means 22, 23, 24 are combined with detector 14 to deliver an electric signal within said interval of the power cycle, as will be set forth hereinunder.

The signals from the vibration sensor 14 and the signals generated by the opening of the contacts of the breaker 10 are transmitted through conductors 15 and 16 respectively to an electronic assembly 17 automatically controlling the spark advance.

The electronic assembly 17 is adapted to provide between the time of opening the contacts of the breaker 10 and the spark time a delay which depends on the possible occurrence of the knocking phenomenon.

This assembly 17 is connected to the trigger circuit of thyristor 7.

The signal delivered by accelerator 14 through conductor 15 is processed in the electronic circuits 17 by the means diagrammatically shown in 43 (FIG. 6), comprising an amplifying circuit, an impedance matching circuit, a threshold circuit permitting passage to this signal only when it exceeds the level corresponding to the occurrence of the knocking phenomenon, and a filtering circuit between the impedance matching circuit and the threshold circuit.

FIG. 2 diagrammatically shows a conventional electronic device for up-counting and downcounting electric pulses.

The digital device comprises $n$ ($n$ being any integer) flip-flop circuits ($b_1, b_2 \ldots b_{n-1}, b_n$) connected in series, which form a chain having a terminal connected to an input C for upcounting electric pulses and the other terminal connected to an input D for downcounting pulses.

Each flip-flop of the chain has a "zero" state and a "one" state for up- and downcounting pulses in the binary system.

It comprises moreover an assembly of set terminals whereby the flip-flop system can be set into a preselected initial state and $n$ output terminals S connected to the different flip-flops and on which appear signals whose assembly represents in the binary system, the result of up- and downcounting the pulses in the device.

This device also comprises a loading input terminal Ch for setting or re-setting it into the state fixed by the set circuits and an input terminal RAZ for setting or re-setting to zero the assembly of the flip-flops.

The device may also comprise a terminal Ro whereon appears a signal when the counting device is set to zero and a terminal $R_1$ whereon appears a signal when the number resulting from the up- and downcounting becomes equal to the number fixed by the maximum capacity of this device.

In the following drawings, the same references as in FIG. 2 are used to designate the corresponding elements of the different up- and/or downcounting devices, with, in addition, the numerical reference of the considered element, for example $I_{19}$, $D_{19}$, $R_{0-19}$, for the element 19, $RAZ_{25}$ for the element 25 . . . etc. . . .

The exemplative embodiment of the invention, illustrated by FIG. 3, comprises a first downcounting device 19 having a terminal $D_{19}$ connected to a contact of breaker 10, so as to receive a downcounting pulse for each opening of the breaker, corresponding to the ignition in one of the four cylinders, i.e. for each half-revolution of the crankshaft.

The device also comprises a second downcounting element 20 having a downcounting terminal $D_{20}$ connected to knocking sensor means. Said sensor means comprises accelerometer 14, circuits 43 (FIG. 6) and AND-gate ($P_1$) which delivers the signals from the accelerometer 14 to terminal $D_{20}$ only during the angular interval of the crankshaft rotation where knocking can occur.

This angular interval is defined by the duration of a signal transmitted through conductor 21 from a flip-flop 22 connected to an element of the type "shift (or sliding) register", whose operation will be described hereinunder, said register being itself controlled by an assembly of circuits 24 adapted to follow degree by degree the rotation of the crankshaft of the engine.

The downcounting element 19 comprises set means $I_{19}$ which registers an initial number of $k_1$ revolutions in this element. When $k_1$ revolutions have been downcounted through terminals $D_{19}$, the element 19 reaches zero and a signal appears on the terminal $R_{0\ 19}$.

Similarly the downcounting element $D_{20}$ comprises set means $I_{20}$ defining an initial number of $k_2$ knockings or pinks in this element.

When $k_2$ knockings detected by sensor 14, have been downcounted through terminal $D_{20}$, from said initial value, the element 20 reaches zero and a signal appears on its terminal $R_{0\ 20}$.

The output terminals $R_{0\ 19}$ and $R_{0\ 20}$ are respectively connected to the up-counting terminal $C_{25}$ and to the downcounting terminal $D_{25}$ of an up- and downcounting element 25, which determines a value in degrees for the spark advance, said value being transmitted from the assembly of the output terminals of the up- and downcounting element 25 to an element 26 controlling the spark advance point, this element being described hereinunder:

The up- and downcounting element 25 which is provided with set means $I_{25}$ has a maximum storage capacity corresponding to the amplitude $\alpha°$ of the angular interval of variation of the ignition, this amplitude being expressed in the binary numerical system, for example in the form $$1\ 1\ 1\ldots 1$$

Moreover the output terminals $R_{0\ 19}$ of the element 19, and $R_{0\ 20}$ of the element 20, are connected to the two input terminals of OR-gate ($P_2$) whose output terminals are connected in parallel to the loading terminal $Ch_{19}$ of the downcounting element 19 and to the loading terminal $Ch_{20}$ of the downcounting element 20.

Thus each output pulse on terminal $R_{0\ 19}$, corresponding to the downcounting of $k_1$ revolutions by element 19, starting from the value fixed by the set circuits of this element, will cause the three following actions:

resetting element 19 to the value $k_1$ through said output pulse, transmitted by the OR-gate $P_2$ to terminal $Ch_{19}$, resetting element 20 to the value $k_2$ through said output pulse transmitted to terminal $Ch_{20}$ through OR-gate $P_2$, adding one unit into the up- and downcounting element 25, upon receival of said output signal on terminal $C_{25}$.

If the up- and downcounting element 25 has already reached the limit value fixed by its set-circuits, it will remain at this value, owing to a connection between the terminals $R_{1-25}$ and the loading terminal $Ch_{25}$ of the up- and downcounting element 25, the new pulse received by terminal $C_{25}$ then only confirming the value or count $$1\ 1\ 1\ldots 1$$

already registered in the up- and downcounting device $CD_{25}$.

Similarly, each output pulse on terminal $R_{0\ 20}$, corresponding to the counting of $k_2$ knockings by the element 20, starting from the value zero, causes the three following actions:

resetting element 20 to the value $k_2$ by this output pulse, transmitted to terminal $Ch_{20}$ through the OR-gate, resetting element 19 to the value $k_1$ by this output pulse, transmitted through the OR-gate to the terminal $Ch_{19}$, decrementing one unit in the up- and downcounter 25 upon receival of this output pulse on terminal $D_{25}$.

If the up- and downcounter 25 has already reached the value zero, it remains at this value, owing to a connection between the terminals $R_{0-25}$ and the reset terminal $RAZ_{25}$ of the up- and downcounter 25, the new pulse received on the terminal $D_{25}$ then only confirming the value $$0\ 0\ 0\ldots 0$$

The spark advance point is controlled through an up- and downcounter 26 to which the counter 25 transmits the number of degrees of the spark advance transmits through the set conductors $I_{26}$ the value $\beta°$ ($0 < \beta° < \alpha°$), appearing on the assembly of its output terminals.

To enable the ignition point to be detected as it relates to the time when the contacts of switch 10 open, as indicated hereinbelow, instead of detecting it by the indication of a classic "spark advance", the value $\beta°$ given by element 25 is equal to the value $\alpha°$ of initialization minus the result of the upcounting-downcounting effected by this element, as indicated hereinabove.

The downcounting element 26 controlling the spark advance point as a function of this value $\beta°$ is triggered for each opening of the breaker 10, the latter being connected through the conductor 28 to the terminal $Ch_{26}$ which controls the loading of element 26.

The element 26 receives moreover on its downcounting terminal $D_{26}$ a downcounting pulse for each degree of rotation of the crankshaft from its position corresponding to the opening of the contacts of the breaker 10.

The downcounting pulses are delivered to the terminal $D_{26}$ by a device 24 which follows degree by degree the rotation of the crankshaft. This device 24 which is also connected to the breaker 10 by the conductor 28 will be described hereinunder, with reference to FIG. 5.

The downcounting element 26 being initially set at the value $\beta°$ elaborated by the counting device 25, and receiving successive downcounting pulses on its terminal $D_{26}$ (i.e. one pulse for each degree of rotation of the crankshaft) delivers a signal on its terminal $R_{O\,26}$ when it reaches zero, i.e. after the crankshaft has rotated over an angle (reckoning from the opening of the contacts of the breaker) whose value in degrees corresponds to the value transmitted by the counting device 25 to the set conductors $I_{26}$ (when this value is equal to zero, i.e. 0 0 0 . . . 0, the time lag of the ignition is maximum, since the signal actuating the ignition circuit then appears on terminal $R_{O\,26}$ as soon as the contacts of the breaker are open).

The ignition control signal appearing on the terminal $R_{O\,26}$ is transmitted to the ignition control means of FIG. 1.

In FIG. 4 is shown the signal (whose duration is T) delivered by the breaker 10 between two successive openings of its contacts.

Under this signal are shown the pulses produced by the circuits 24 for each degree of rotation of the crankshaft.

The interval of ignition is comprised between the angular position $\alpha_A$ (maximum spark advance), corresponding to the opening of the contacts of the breaker and the angular position $\alpha_B$ (minimum advance) of the crankshaft. The amplitude $$\alpha_B - \alpha_A = \alpha°$$

of the control range is fixed by the set circuits $I_{25}$ of the counter 25.

The value $\beta$ determined by the downcounting element 26 sets the angular position $\alpha_C$ for the ignition of the spark plug 4:

$$\alpha_c = \alpha_A + \beta$$

with $0 < \beta < \alpha$

FIG. 5 illustrates an advantageous embodiment of the means (22, 23, 24) for detecting the rotation of the crankshaft.

In the device of FIG. 5 the breaker 10 is connected through conductor 28 to a first input terminal of an electronic circuit 29 of the type AND-gate to which it transmits its pulses with a period varying with the speed of rotation of the shaft 12 driving cam 11. This speed of rotation is equal to half the speed of rotation of the crankshaft which rotates over 180° between two successive openings of the contacts of breaker 10, produced by the cam 11.

T designates the time interval between two consecutive pulses $I_1, I_2 . . .$ delivered by breaker 10. Then $F = 1/T$, F being the opening frequency of the breaker.

A resistor-capacitor circuit 30 oscillating at frequency $f_1$ is connected to a circuit 31 dividing by 180, which is in turn connected, through conductor 32, to a second input terminal of circuit 29 to which it delivers pulses at the frequency $$f_2 = f_1/180.$$

The output of circuit 29 is connected to the upcounting terminal $C_{33}$ of a counter of electric pulses 33. This counter may be of a conventional type known in the art as "Type 7493" and sold by various firms.

After a first opening of the breaker, the number of pulses, recorded by the counter 33 during the time interval T separating the pulses $I_1$ and $I_2$ and corresponding to a quarter of revolution of the shaft 12, is $F_2T$.

The $n$ flip-flops of counter 33 are connected in parallel through $n$ conductors to an equal number of independent flip-flops of a memory 34. This memory 34 may be of a conventional type known in the art as "type 7474".

The counter 33 has an input terminal for resetting to zero $RAZ_{33}$, which is connected to breaker 10 through a conductor 35 comprising conventional means 35A for delaying the transmission of the leading edge of pulses $I_1, I_2 . . .$ to the terminal $RAZ_{33}$ of counter 33.

The memory 34 has a loading input terminal $Ch_{34}$ connected to the breaker through conductor 36.

Under these conditions, when the contacts of the breaker open again after cam 11 has made a quarter of revolution, the leading edge 34A of pulse $I_2$ which it delivers transfers the numerical count $f_2 \times T$ of counter 33 into memory 34, then the pulse leading edge 33A received by counter 33 with some time lag, with respect to the pulse leading edge 34A (a time lag generated by means 35A), re-sets to zero counter 33. The latter is then ready again for recording new pulses from gate 29 during a new rotation of shaft 12.

The memorizing storage circuit 34 has $n$ output terminals which are respectively connected to the $n$ set terminals of a downcounting element 37 (Type 74 193, for example).

This element 37 has an upcounting input terminal $D_{37}$ connected through conductor 38 to the output of oscillator 30 of frequency $f_1$. The circuit 37 has also a terminal $R_{O\,37}$ on which appears a signal each time this downcounter reaches zero.

The time interval necessary for resetting to zero element 37 whose initial numerical count delivered by the storage circuit is $f_2T$ and which receives downcounting pulses at frequency $f_1$, is:

$$T_s = \frac{f_2 \times T}{f_1}$$

and the frequency at which element 37 reaches zero is thus:

$$f = \frac{f_1}{f_2 \times T} = \frac{180 \times f_2}{f_2/F} = 180 \times F$$

F being the frequency of opening contacts of breaker 10.

In other words, 180 pulses appear on the terminal $R_0$ 37 of the downcounting element 37 for each quarter of revolution of the cam 11, corresponding to a rotation of 180° of the crankshaft.

The downcounting element 37 has a loading input terminal $Ch_{37}$ which is connected to its input terminal through conductor 39. Thus at each time the downcounting element 37 reaches zero, the signal which is delivered on terminal $R_0$ 37, automatically resets this element to its loading position.

The output terminal $R_0$ 37 of the downcounting element 37 is connected through conductor 40 to the input terminal $C_{23}$ of a circuit 23 of the "shift register" type which is well known in the art (Type 74 164, for example), comprising 180 output terminals.

Thus 180 pulses will appear on the output terminal $R_0$ 37 of element 37, between two openings of the contacts of the breaker 10, each of these pulses corresponding to a rotation of 1 degree of the crankshaft, assuming a constant speed of rotation of the engine over the whole considered 180° interval, whereas this speed may vary from a 180° interval to the following interval corresponding to the ignition in another cylinder.

Each of these pulses results in an incrementation in device 23, a pulse then successively appearing on each of the 180 output terminals of device 23, thus following degree by degree the rotation of the crankshaft.

The counter 23 has a terminal $RAZ_{23}$ for resetting it to zero, connected to the breaker 10 through conductor 41, so as to be reset to zero at each opening of the contacts of breaker 10 by cam 11.

The shift register 23 makes it possible to select the "angular range" wherein are exclusively taken into account the vibrations detected by sensor 14, this "range" being so selected as to correspond to the interval of the power cycle wherein can be found the knocking phenomenon, as hereinabove indicated.

To this end the two output terminals of the shift register 23, corresponding to the two limit-angles of this "angular range" are respectively connected to the two input terminals of a flip-flop circuit 22 of the SET-RESET type. This flip-flop is connected through conductor 21 to the AND-gate to which is connected sensor 14 (FIG. 3) as well as the filter associated thereto (FIG. 6).

The flip-flop thus delivers a square wave between the two angular positions delimiting the selected "angular range". This square wave begins when a signal appears on the output terminal of the register 23 corresponding to the first limit-angle of this "angular range" (first change of state of flip-flop 22) and this square wave ends when a signal appears on the output terminal of register 23, corresponding to the second limit angle of the "angular range" (second change of state of the flip-flop 22).

Moreover in the embodiment illustrated by FIG. 6 safety means are provided to obviate a failure in the operation of the knocking sensor 14. In this embodiment one of the terminals of the shift register 23 delivers through conductor 42 a control signal defining a standard spark advance which is transmitted to the device 27 exclusively in case of non-operation of the knocking sensor 14. This standard spark advance is sufficiently small to prevent any knocking liability.

The device 27 thus receives through an OR-gate ($P_3$) to which it is connected through connector 18, either the computed control signal, appearing on terminal $R_0$ 26 of element 26, or the signal defining a standard spark advance, delivered through conductor 42.

One of these two signals is delivered to OR-gate $P_3$ by an assembly of two AND-gates, a first of which (gate $P_4$) is connected to terminal $R_0$ 26 and the other (gate $P_5$) to conductor 42. Opening of one or the other of said two gates is controlled by a flip-flop 44 which delivers a signal to gate $P_4$ through conductor 47 when the knocking sensor 14 is energized and which transmits a signal to gate $P_5$ through conductor if the knocking sensor 14 is not actuated.

The operation or non-operation of sensor 14 is determined by a flip-flop 44, connected to this sensor through conductor 45 and to an output terminal 46 of the shift register 23 through conductor 46.

1st case: When sensor 14 is in operation, the output signals of this detector put the flip-flop 44 into a "one" state which is not modified by a short pulse appearing on terminal 46 of the shift register 23 when the crankshaft passes through the first angular position detected by this terminal of register 23. In this "one" state the flip-flop 44 controls, through conductor 47, the opening of gate $P_4$ which allows passage of the computed control signal appearing on terminl $R_0$ 26.

2nd case: On the contrary when sensor 14 is not energized, thus delivering no signal, the pulse appearing on terminal 46 puts the flip-flop 44 into a "two" state wherein said pulse controls, through conductor 48, the opening of gate $P_5$ which allows passage only to the signal controlling a standard spark advance, which is delivered through the conductor.

In the first case gate $P_5$ is not open, since conductor 48 transmits no signal, whereas in the second case it is gate $P_4$ which remains closed, since conductor 47 transmits no signal.

We claim:
1. An automatic device for optimum control of the spark advance point in a spark ignition circuit of an engine, comprising
   means for detecting the occurrence of knocking during the combustion, said detecting means being responsive to the vibration of the engine exclusively during a fraction of the combustion phase corresponding to a selected angular interval of rotation of the crankshaft,
   adjustment means actuated by said detection means and connected to the ignition circuit, said adjustment means applying a time-delay to the ignition circuit upon detection of a selected number of knock-containing power cycles,
   and means for following the rotation of the crankshaft and producing successive electric pulses corresponding to consecutive angular positions of the crankshaft in order to define said angular interval during which said detecting means is responsive to the engine vibrations,
   wherein said adjustment means comprises
   a first adding circuit delivering a signal after summing up a fixed number of power cycles,
   a second adding circuit for delivering a signal after summing up a fixed number of knock-containing power cycles, each of said adding circuits having an output terminal connected to terminals for simultaneously resetting both adding circuits,
   electric up- and downcounting means connected to both of said adding circuits for delivering a spark advance control signal defining an angular correction for the spark advance having a range with preselected limit values and dependent on the difference of the respective numbers of signals delivered by said first and second adding circuits, and control means, connected to said up- and downcounting means and to said means following the rotation of the crankshaft for controlling the spark advance in said spark ignition circuit.

2. A device according to claim 1, wherein said first and second adding means are digital downcounting devices having downcounting terminals respectively connected to a device delivering an electric signal for each power cycle and to said detection means, and wherein said adding means comprise set circuits defining respectively a fixed initial number of power cycles and a fixed initial number of knock-containing power cycles.

3. A device according to claim 1, wherein said up- and downcounting means has a maximum storage capacity which digitally defines the angular control range for the spark advance, a terminal for loading said up- and downcounting means at said set value, a terminal for resetting to zero, an upcounting terminal connected to the output terminal of said first adding circuit, a downcounting terminal connected to the output terminal of said second adding circuit, a reset terminal whereon appears a signal when the digital count of said downcounting means becomes equal to zero, said reset terminal being connected to said terminal for resetting to zero said downcounting means, a coincidence terminal whereon appears a signal when the digital count of said downcounting becomes equal to the value set by said maximum storage capacity, said coincidence terminal being connected to said loading terminal, and wherein said up- and downcounting means comprises a plurality of output terminals corresponding to the successive orders of a digital system, so as to deliver the spark advance signal in a digital form.

4. A device according to claim 3, wherein said control means comprises a downcounter having set terminals in a number equal to the number of output terminals of said up- and downcounting means and which are respectively connected to these output terminals, a downcounting input terminal connected to said means following the rotation of the crankshaft, and an output terminal connected to the ignition circuit of the engine.

5. A device according to claim 1, wherein said rotation following means includes:
a shift register which is shifted in accordance with said successive electric pulses corresponding to consecutive angular positions of the crankshaft, said shift register having two terminals which define said angular range;
a flip flop element having its input terminals connected to said two terminals of said shift register; and
an AND gate with one input terminal connected to the output of said flip flop element, with a second input terminal connected to said knock detecting means, and with the output thereof connected to the input terminal of said second adding circuit.

6. A device according to claim 1, wherein said rotation following means includes a shift register which is shifted in accordance with said successive electric pulses, said shift register having an output terminal defining a standard spark advance; and
wherein said adjustment means further includes an assembly of gate circuits arranged between said ignition circuit and said control means for delivering either the output from said control means or the output from said terminal defining the standard spark advance in accordance with whether said knock detecting means is operating properly.

7. An automatic device for optimum control of the spark advance point in a spark ignition circuit of an engine, comprising
means for detecting the occurrence of knocking during the combustion, said detecting means being responsive to the vibration of the engine exclusively during a fraction of the combustion phase corresponding to a selected angular interval of rotation of the crankshaft,
adjustment means actuated by said detection means and connected to the ignition circuit, and adjustment means applying a time-delay to the ignition circuit upon detection of a selected number of knock-containing power cycles,
and means for following the rotation of the crankshaft and producing successive electric pulses corresponding to consecutive angular positions of the crankshaft in order to define said angular interval during which said detecting means is responsive to the engine vibrations,
wherein said adjustment means comprises
a first adding circuit delivering a signal after summing up a fixed number of power cycles,
a second adding circuit for delivering a signal after summing up a fixed number of knock-containing power cycles, each of said adding circuits having an output terminal connected to terminals for simultaneously resetting both adding circuits,
electric up- and downcounting means connected to both of said adding circuits for delivering a spark advance control signal defining an angular correction for the spark advance having a range with preselected limit values and dependent on the difference of the respective numbers of signals delivered by said first and second adding circuits, and
control means, connected to said up- and downcounting means and to said means following the rotation of the crankshaft for controlling the spark advance in said spark ignition circuit,
wherein said means following the rotation of the driving shaft comprises in combination:
means for detecting the passage of this shaft to a reference angular position in the form of electric reference signals,
an oscillator delivering electric signals at a fixed frequency, this oscillator being connected to an input terminal of a digital downcounter having a plurality of set terminals,
a frequency divider connected to said input terminal of said digital downcounter and having an output terminal connected to the input terminal of a numerical upcounter having a number of output terminals, equal to the number of said set terminals and which correspond respectively to the successive orders of a numeration system,
a pulse storage means formed by memory elements in a number equal to the output terminals of said upcounter, each of these elements being respectively connected to an output terminal of said digital upcounter and a set terminal of said downcounter, said pulse storage means having a loading control terminal connected to said detector, so as to be actuated by each reference signal, said digital upcounter having a terminal for resetting to zero connected to said detector through time delaying means and said downcounter having an output terminal whereon appears an identification signal at each time when the digital count of this downcounter reaches, while decreasing, a preselected value, said identification signal showing the passage of the shaft through an angular position in fixed relationship with said reference position.

8. A device according to claim 7, wherein said output terminal of the downcounting means is connected to a shift register having a number of output terminals corresponding to the number by which the frequency divider divides the frequency of the electric signals generated by the oscillator.

9. A device according to claim 8, wherein said frequency divider divides by 180 the frequency of the electric signals generated by the oscillator and the shift register comprises a plurality of output terminals corresponding to the successive rotations by one degree of the drive shaft during half a revolution thereof.

10. A device according to claim 8, wherein said shift register has two output terminals which define an angular range, said two terminals being respectively connected to two input terminals of a flip-flop element having an output terminal connected to a first input terminal of an AND-gate, a second input terminal of said AND-gate being connected to said means for detecting the engine vibrations and the output terminal of said AND-gate being connected to the input terminal of said second adding circuit.

11. A device according to claim 8, wherein said shift register comprises an output terminal defining a standard spark advance and wherein an assembly of gate circuits is arranged between said ignition circuit and said control means of the ignition circuit, said assembly being connected to said terminal defining the standard spark advance and being controlled by said means for detecting the knocking so that it passes to the ignition circuit exclusively a pulse delivered by said control means or a pulse from said terminal defining the standard spark advance, depending upon whether said means for detection of the knocking is or is not energized.

12. A device for the optimum control of the sparking time of a spark ignition circuit of an engine during its operation comprising:
means for detecting the occurrence of knocking during the combustion, said detecting means being responsive to the vibrations of the engine exclusively during a fraction of the combustion phase corresponding to a selected angular interval of rotation of the crankshaft, and
adjustment means actuated by said detection means for producing an adjustable spark advance for the ignition circuit, said adjustment means including counting means connected to said detection means for determining the proportion of knock-containing power cycles in successive power cycles of the engine and comparing this proportion to a preselected upper limit value, said counting means being adapted to increase progressively the spark advance towards a maximum value when said proportion is lower than said upper preselected limit value and to reduce progressively the spark advance towards a minimum value when said proportion is lower than said upper preselected limit value.

13. An automatic device for optimum control of the spark advance point in a spark ignition circuit of an engine, comprising
means for detecting the occurrence of knocking during the combustion, said detecting means being responsive to the vibration of the engine exclusively during a fraction of the combustion phase corresponding to a selected angular interval of rotation of the crankshaft,
adjustment means actuated by said detection means and connected to the ignition circuit, said adjustment means applying a time-delay to the ignition circuit upon detection of a selected number of knock-containing power cycles,
and means for following the rotation of the crankshaft and producing successive electric pulses corresponding to consecutive angular positions of the crankshaft in order to define said angular interval during which said detecting means is responsive to the engine vibrations,
wherein said adjustment means comprises
a first adding circuit delivering a signal after summing up a fixed number of power cycles,
a second adding circuit for delivering a signal after summing up a fixed number of knock-containing power cycles, each of said adding circuits having an output terminal connected to terminals for simultaneously resetting both adding circuits,
electric up- and downcounting means connected to both of said adding circuits for delivering a spark advance control signal defining an angular correction for the spark advance having a range with preselected limit values and dependent on the difference of the respective numbers of signals delivered by said first and second adding circuits,
control means connected to said up- and downcounting means and to said means following the rotation of the crankshaft for controlling the spark advance in said spark ignition circuit
and safety means responsive to a possible failure in the operation of said knocking detection means, said safety means being connected to said detection means, to said means following the rotation of the crankshaft and to the ignition circuit of the engine, said safety means being adapted to deliver a control signal defining a standard spark advance in case of failure in the operation of said detection means.

14. An automatic spark advance control system for a spark ignition circuit of an engine comprising:
means for detecting the occurrence of knocking during engine combustion and generating pulses in accordance therewith;
first counter means for counting the number of knocks of the engine up to a preset count $K_2$;
means for applying the pulses from said detection means to count said first counter means only during the fraction of the combustion phase corresponding to a selected angular interval of rotation of the crankshaft of the engine;
second counter means for counting the number of power cycles of the engine up to a preset count $K_1$;
means for changing the spark advance in a direction depending upon which of said counter means counts to its preset count first; and
means for resetting both of said counter means when either one counts to its preset count.

15. An automatic spark advance control system as defined in claim 14, wherein said changing means includes an up/down counter for counting up or down in dependence on which of said counter means counted to its preset count first.

16. An automatic spark advance control system as defined in claim 14, further comprising means for delivering a standard spark advance control signal to said ignition circuit when said detecting means fails to operate properly.

17. A method for the automatic spark advance control for a spark ignition engine comprising the steps of:
counting the number of knocks of the engine up to a preset count $K_2$;
simultaneously counting the number of power cycles of the engine up to a preset number $K_1$;
changing the spark advance in a direction depending upon which of said preset $K_2$ or $K_1$ is reached first; and
repeating the above-recited steps upon the preset count being reached in either step.

18. A method as set forth in claim 17, wherein said knock counting step includes the step of detecting the occurrence of knocking only during the fraction of the combustion phase of the engine corresponding to a selected angular interval of rotation of the crankshaft of the engine.

19. A method as defined in claim 18, further comprising the step of delivering a standard spark advance control signal to set the spark advance point of said engine when said knock detecting step is not being properly performed.

* * * * *

UNITED STATES PATENT AND TRADEMARK OFFICE
CERTIFICATE OF CORRECTION

PATENT NO. : 4,120,272
DATED : October 17, 1978
INVENTOR(S) : Andre Douaud and Joseph Rialan It is certified that error appears in the above-identified patent and that said Letters Patent are hereby corrected as shown below:

In Claim 12, column 11, line 67, the term "lower" should read --greater--.

Signed and Sealed this

Twenty-fifth Day of March 1980

[SEAL]

Attest:

SIDNEY A. DIAMOND

Attesting Officer     Commissioner of Patents and Trademarks